United States Patent
Chen

(10) Patent No.: US 9,178,686 B2
(45) Date of Patent: Nov. 3, 2015

(54) SNR IMPROVEMENT CIRCUIT, SYNCHRONIZATION INFORMATION DETECTION CIRCUIT, COMMUNICATION DEVICE, SNR IMPROVEMENT METHOD, AND SYNCHRONIZATION INFORMATION DETECTION METHOD

(75) Inventor: Handa Chen, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 148 days.

(21) Appl. No.: 13/983,924

(22) PCT Filed: Jan. 20, 2012

(86) PCT No.: PCT/JP2012/051237
§ 371 (c)(1), (2), (4) Date: Aug. 6, 2013

(87) PCT Pub. No.: WO2012/108249
PCT Pub. Date: Aug. 16, 2012

(65) Prior Publication Data
US 2013/0315266 A1    Nov. 28, 2013

(30) Foreign Application Priority Data
Feb. 9, 2011    (JP) ................................. 2011-026013

(51) Int. Cl.
*H04B 17/02* (2006.01)
*H04L 7/00* (2006.01)
(Continued)

(52) U.S. Cl.
CPC .............. *H04L 7/0041* (2013.01); *H04L 7/042* (2013.01); *H04L 27/2656* (2013.01); *H04L 27/2675* (2013.01); *H04L 27/2692* (2013.01)

(58) Field of Classification Search
None
See application file for complete search history.

(56) References Cited

U.S. PATENT DOCUMENTS 7,203,245 B1 *  4/2007  Murphy ........................ 375/260
7,280,621 B1 * 10/2007  Murphy ........................ 375/340
(Continued)

FOREIGN PATENT DOCUMENTS

CN        101305537 A    11/2008
CN        101652946 A     2/2010
(Continued)

OTHER PUBLICATIONS

Office Action issued on Jan. 14, 2014 in the corresponding Japanese Patent Application No. JP2011-026013 (with English Translation).
(Continued)

*Primary Examiner* — Anh-Vu Ly
(74) *Attorney, Agent, or Firm* — Oblon, McClelland, Maier & Neustadt, L.L.P.

(57) ABSTRACT

A technique capable of improving a packet catch rate when applied to a communication device, for example. An SNR improvement circuit for improving an SNR of an input signal includes a delay unit for delaying the input signal to generate one or more delay signals, and an adder for adding the one or more delay signals and the input signal before being delayed. The input signal contains a periodic signal in which the same signal is repeated a predetermined number of times with a predetermined period. The delay unit generates the one or more delay signals with delay time which is α times (α is a natural number, and is set at different values with respect to two or more delay signals) longer than the predetermined period.

7 Claims, 6 Drawing Sheets

(51) Int. Cl.
*H04L 7/04* (2006.01)
*H04L 27/26* (2006.01)

(56) References Cited

U.S. PATENT DOCUMENTS

| | | | |
|---|---|---|---|
| 7,548,579 B1 * | 6/2009 | Murphy et al. | 375/147 |
| 7,738,538 B1 * | 6/2010 | Tung | 375/150 |
| 8,335,283 B1 * | 12/2012 | Sun | 375/343 |
| 2005/0117674 A1 | 6/2005 | Jeon et al. | |
| 2008/0089443 A1 * | 4/2008 | Sanada et al. | 375/319 |
| 2009/0305629 A1 * | 12/2009 | Izumi et al. | 455/39 |
| 2010/0040044 A1 * | 2/2010 | Izumi et al. | 370/350 |
| 2010/0118849 A1 | 5/2010 | Kimura | |

FOREIGN PATENT DOCUMENTS

| | | |
|---|---|---|
| JP | 11 145931 | 5/1999 |
| JP | 2003-333011 A | 11/2003 |
| JP | 2004-56552 A | 2/2004 |
| JP | 2009 71643 | 4/2009 |
| WO | 2008 126356 | 10/2008 |

OTHER PUBLICATIONS

International Search Report Issued Feb. 14, 2012 in PCT/JP12/051237 Filed Jan. 20, 2012.

International Preliminary Report on Patentability issued Aug. 22, 2013 in PCT/JP2012/051237 filed Jan. 20, 2012.

Written Opinion issued Feb. 14, 2012 in PCT/JP2012/051237 filed Jan. 20, 2012 with English language translation.

Chinese Office Action issued Jul. 3, 2015, for Chinese Patent Application 201280008399.7 (English translation provided).

* cited by examiner

F I G. 8
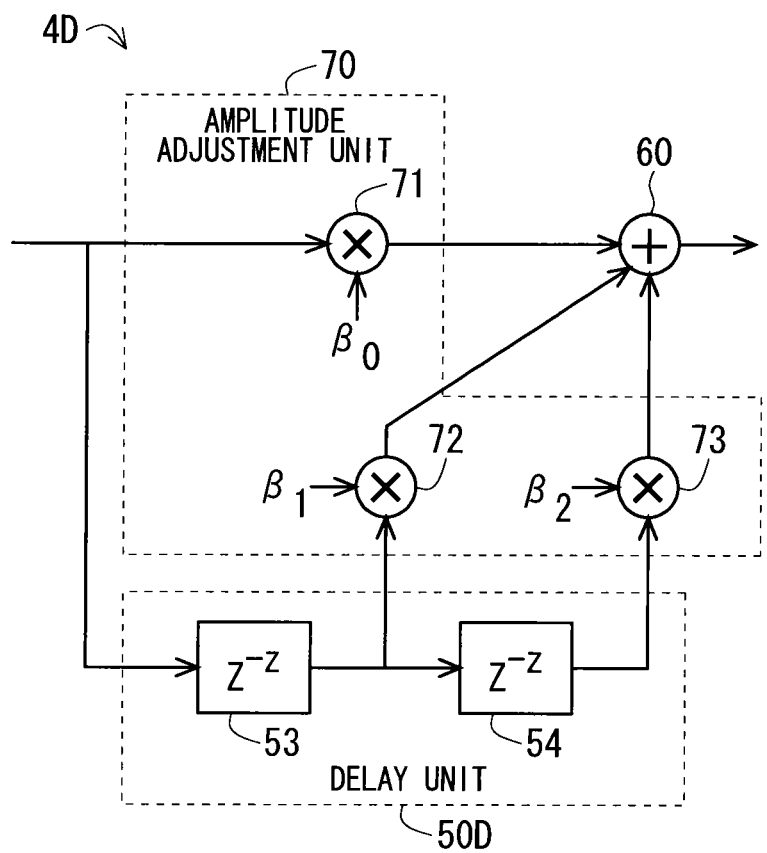

SNR IMPROVEMENT CIRCUIT, SYNCHRONIZATION INFORMATION DETECTION CIRCUIT, COMMUNICATION DEVICE, SNR IMPROVEMENT METHOD, AND SYNCHRONIZATION INFORMATION DETECTION METHOD

TECHNICAL FIELD

The present invention relates to an SNR (Signal to Noise Ratio) improvement circuit, a synchronization information detection circuit, a communication device, an SNR improvement method, and a synchronization information detection method.

BACKGROUND ART

Generally, in packet-type communication, a receiving-side device does not grasp when a transmitting-side device will transmit a packet, namely when a packet will arrive at the receiving-side device. Hence the receiving-side device needs to stand by for a packet to come, and detect a packet out of signals received during the standby. Further, in order to appropriately perform a variety of processing on the received packet, it is necessary to perform a variety of processing in synchronization with a configuration of the packet. Such synchronization is performed with respect to each received packet, namely every time a packet is detected.

For example, Patent Document 1 describes a symbol timing detection circuit for an OFDM (Orthogonal Frequency Division Multiplexing) demodulator.

PRIOR ART DOCUMENT

Patent Document

Patent Document 1: Japanese Patent Application Laid-Open No. 11-145931 (1999)

SUMMARY OF THE INVENTION

Problems to be Solved by the Invention

In the packet communication, when the receiving-side device is unable to appropriately receive a packet, it destroys the packet and stands by for a next packet to come. For this reason, the communication efficiency is low when a packet detection rate (also referred to as a packet catch rate) is low, and it has thus been desired to improve the packet catch rate.

Especially when the sensitivity is low, namely when an SNR is low, the packet catch rate is low.

An object of the present invention is to provide a variety of techniques which are capable of improving a packet catch rate when applied to a communication device, for example.

Means for Solving the Problems

An SNR improvement circuit according to a first aspect of the present invention is an SNR improvement circuit for improving an SNR of an input signal, the circuit including: a delay unit for delaying the input signal to generate one or more delay signals; and an adder for adding the one or more delay signals and the input signal before being delayed, wherein the input signal contains a periodic signal in which the same signal is repeated a predetermined number of times with a predetermined period, and the delay unit generates the one or more delay signals with delay time which is $\alpha$ times ($\alpha$ is a natural number, and is set at different values with respect to two or more delay signals) longer than the predetermined period.

Further, an SNR improvement circuit according to a second aspect is the SNR improvement circuit according to the first aspect, further including an amplitude adjustment unit for making amplitude of at least one signal out of the input signal before being delayed and the one or more delay signals $\beta$ times larger ($\beta$ is a positive number, and is set at respective values with respect to a plurality of signals), wherein the adder performs addition on the at least one signal by use of the signal after the amplitude thereof has been made $\beta$ times larger in the amplitude adjustment unit, and the $\beta$ is set at a value which can alleviate fading in a result of the addition in the adder as compared with a configuration not including the amplitude adjustment unit.

Further, an SNR improvement circuit according to a third aspect is the SNR improvement circuit according to the first aspect, wherein the one or more delay signals are a delay signal of the $\alpha=1$ and a delay signal of the $\alpha=2$. Further, an SNR improvement circuit according to a fourth aspect is the SNR improvement circuit according to the second aspect, wherein the one or more delay signals are a delay signal of the $\alpha=1$ and a delay signal of the $\alpha=2$.

Further, an SNR improvement circuit according to a fifth aspect is the SNR improvement circuit according to the fourth aspect, wherein the at least one signal processed in the amplitude adjustment unit is the delay signal of the $\alpha=1$, and the $\beta=4$ is set with respect to the delay signal of the $\alpha=1$.

Further, a synchronization information detection circuit according to a sixth aspect includes: the SNR improvement circuit according to any one of the first to fifth aspects; and a synchronization information detection processing circuit which performs processing for detecting synchronization information on the input signal from a result of addition by the adder of the SNR improvement circuit.

Further, a communication device according to a seventh aspect is a communication device for performing communication by use of a packet having in a synchronization header a periodic signal in which the same signal is repeated a predetermined number of times with a predetermined period, the device including the synchronization information detection circuit according to the sixth aspect, wherein the SNR improvement circuit inside the synchronization information detection circuit operates, regarding a reception signal containing the packet as the input signal, and the synchronization information detection processing circuit inside the synchronization information detection circuit performs detection processing for the synchronization information on an output signal from the SNR improvement circuit, to output a synchronization timing signal of the packet in synchronization with the timing for detection of the synchronization information.

Further, an SNR improvement method according to an eighth aspect is an SNR improvement method for improving an SNR of an input signal, the method including: delay processing for delaying the input signal to generate one or more delay signals; and addition processing for adding the one or more delay signals and the input signal before being delayed, wherein the input signal contains a periodic signal in which the same signal is repeated a predetermined number of times with a predetermined period, and in the delay processing, the one or more delay signals are generated with delay time which is $\alpha$ times ($\alpha$ is a natural number, and is set at different values with respect to two or more delay signals) longer than the predetermined period.

Further, an SNR improvement method according to a ninth aspect is the SNR improvement method according to the eighth aspect, further including amplitude adjustment processing for making amplitude of at least one signal out of the input signal before being delayed and the one or more delay signals β times larger (β is a positive number, and is set at respective values with respect to a plurality of signals), wherein in the addition processing, addition is performed on the at least one signal by use of the signal after the amplitude thereof has been made β times larger in the amplitude adjustment processing, and the β is set at a value which can alleviate fading in a result of addition in the addition processing as compared with the case of not performing the amplitude adjustment processing.

Further, a synchronization information detection method according to a tenth aspect includes: each processing in the SNR improvement method according to the eighth or ninth aspect; and synchronization information detection processing which performs processing for detecting synchronization information on the input signal from a result of addition by the addition processing of the SNR improvement method.

Effects of the Invention

According to the first aspect, in an output signal from the adder, a periodic signal portion is amplified as compared with in the original input signal. On the other hand, since noises contained in the input signal are random and phases thereof are not uniformed, amplitudes of the noises are not uniformly amplified. Hence it is possible to improve an SNR of the periodic signal portion. Furthermore, since an SNR improvement effect can be obtained by such simple processing as delaying and addition, it is possible to provide the SNR improvement circuit at low cost.

According to the second aspect, when there is a frequency error, a decrease in SNR due to fading can be prevented. Furthermore, since the SNR decrease preventive effect can be obtained by such simple processing as amplitude adjustment, it is possible to provide the SNR improvement circuit at low cost.

According to the third and fourth aspects, it is possible to obtain the SNR improvement effect balanced with a delay. Further, since two kinds of delay signals may only be generated, it is possible to simplify the configuration of the delay unit.

According to the fifth aspect, since the amplitude adjustment is performed only on one delay signal, it is possible to simplify the configuration of the amplitude adjustment unit. Further, by setting of β=4, amplitude adjustment can be performed not by multiplication but only by shift computing, and hence it is possible to make the circuit scale small.

According to the sixth aspect, since the detection of synchronization information is performed on the signal with its SNR improved, it is possible to obtain high detection accuracy as compared with that of a configuration not having the SNR improvement circuit.

According to the seventh aspect, the synchronization header can be detected with high detection accuracy, a probability for detecting the packet out of the reception signal, namely a packet catch rate, is high. This can result in improvement in communication efficiency.

According to the eighth aspect, in a signal after the addition processing, a periodic signal portion is amplified as compared with in the original input signal. On the other hand, since noises contained in the input signal are random and phases thereof are not uniformed, amplitudes of the noises are not uniformly amplified. Hence it is possible to improve an SNR of the periodic signal portion. Furthermore, the SNR improvement effect can be obtained by such simple processing as delaying and addition.

According to the ninth aspect, when there is a frequency error, a decrease in SNR due to fading can be prevented. Furthermore, it is possible to obtain an SNR decrease preventive effect by such simple processing as adjustment of amplitude.

According to the tenth aspect, since the detection of synchronization information is performed on the signal with its SNR improved, it is possible to obtain high detection accuracy as compared with the case of not adopting the SNR improvement method.

Objects, features, aspects and advantages of the present invention will become more apparent from the following detailed description and the accompanying drawings.

BRIEF DESCRIPTION OF DRAWINGS

FIG. 8 is a block diagram showing a constitutional example of an SNR improvement circuit according to a third embodiment.

EMBODIMENT FOR CARRYING OUT THE INVENTION

First Embodiment

Outline of Communication Device

Figure 1:
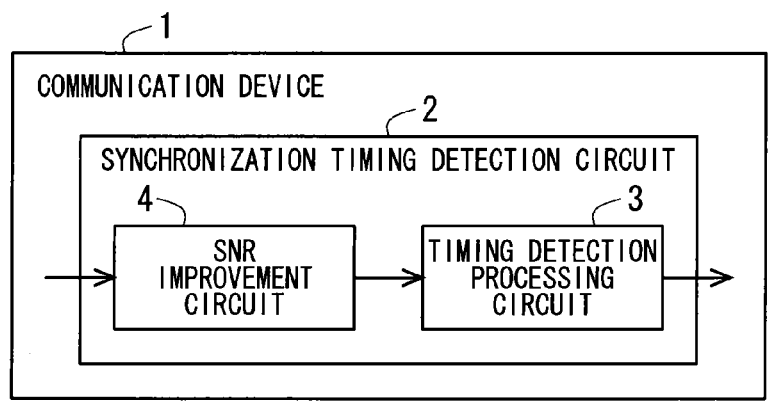
FIG. 1 is a block diagram giving an outline of a communication device according to a first embodiment.

FIG. 1 shows a block diagram giving an outline of a communication device 1 according to a first embodiment. Although a case will be exemplified here in which the communication device 1 is a wireless communication device conforming to OFDM, this case is not restrictive.

The communication device 1 has at least a reception function. That is, the communication device 1 is a receive-only device or a transmitting/receiving device. In the example of FIG. 1, the communication device 1 has a synchronization timing detection circuit (i.e., synchronization information detection circuit) 2 which constitutes part of the reception function, and the synchronization timing detection circuit 2 has a timing detection processing circuit (i.e., synchronization information detection processing circuit) 3 and an SNR improvement circuit 4.

The synchronization timing detection circuit 2 performs predetermined processing on a reception signal, to detect as synchronization information the timing for synchronization with a packet contained in the reception signal, and generates and outputs a synchronization timing signal for providing the detected timing. The synchronization timing signal is used for a variety of processing (e.g., FFT (Fast Fourier Transform) computing) on a received packet. It is to be noted that the synchronization timing detection circuit 2 constitutes part of a physical layer (first layer) of a so-called OSI (Open System Interconnection) reference model.

It is to be noted that detecting the timing for synchronization with a received packet is none other than detecting a packet out of a reception signal (i.e., catching a packet), and the detection of the timing for synchronization and the detection of the packet are to be simultaneously performed.

A signal to be inputted into the synchronization timing detection circuit 2 is a digital OFDM baseband signal. This baseband signal is obtained for example by sequentially performing, on an RF (Radio Frequency) signal received by an antenna, frequency conversion to an IF (Intermediate Frequency) signal, conversion to an analog baseband signal, and A/D (Analog to Digital) conversion. The processing for generating a digital baseband signal from the received RF signal is performed in another part (not shown) of the physical layer.

The foregoing original function of the synchronization timing detection circuit 2 is realized by the timing detection processing circuit 3 in the circuit 2. That is, the timing detection processing circuit 3 performs predetermined processing on the reception signal (here, the digital OFDM baseband signal), thereby to detect as synchronization information the timing for synchronization with a packet contained in the reception signal, and outputs the result of the detection. The output of the timing detection processing circuit 3 becomes the output of the synchronization timing detection circuit 2, namely a synchronization timing signal.

The conventional synchronization timing detection circuit is configured only of the timing detection processing circuit 3, whereas the synchronization timing detection circuit 2 according to the present embodiment not only has the timing detection processing circuit 3 but further has the SNR improvement circuit 4.

The SNR improvement circuit 4 improves an SNR of a signal inputted into the SNR improvement circuit 4 and outputs it. Especially, the SNR improvement circuit 4 is provided at a stage prior to the timing detection processing circuit 3. For this reason, a signal as an object to be processed in the synchronization timing detection circuit 2 is improved in terms of its SNR in the SNR improvement circuit 4, and then inputted into the timing detection processing circuit 3.

Packet Configuration

Figure 2:
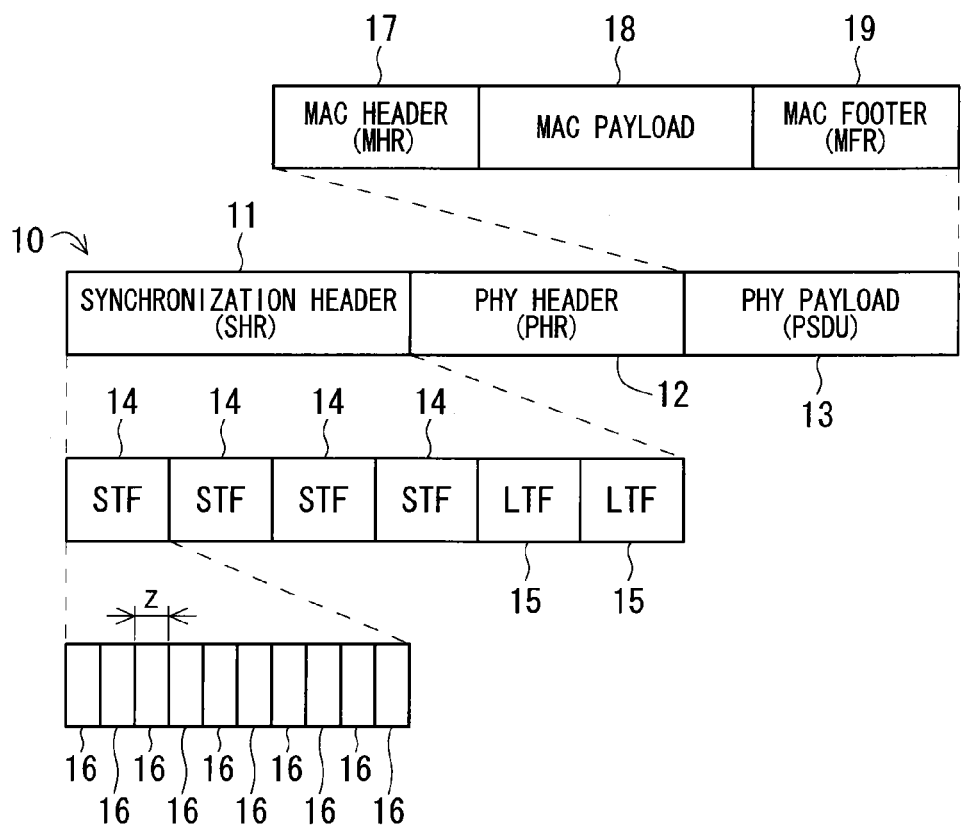
FIG. 2 is a diagram giving an outline of a packet configuration according to the first embodiment.

FIG. 2 shows a schematic view of a configuration of a packet that is received in the communication device 1. It is to be noted that the packet configuration of FIG. 2 conforms to IEEE802.15.4g. A packet 10 shown in FIG. 2 includes a synchronization header 11, a PHY (physical layer) header 12 following the synchronization header 11, and a PHY payload 13 following the PHY header 12.

The synchronization header 11 includes four consecutive short training fields (STFs) 14 and two long training fields (LTFs) 15 following these STFs 14. The four STFs 14 have the same contents, and the two LTFs 15 have the same contents. A bit length corresponding to one OFDM symbol is allocated to each of the STFs 14 and the LTFs 15.

The STF 14 has a configuration formed by repeating a previously defined fixed pattern signal 16 with a predetermined period z and a predetermined number of times (here, ten times). That is, the STF 14 is a signal with periodicity (periodic signal).

Further, the payload 13 includes a MAC (Media Access Control) header 17, a MAC payload 18 following the MAC header 17, and a MAC footer 19 following the MAC payload 18.

Example of Timing Detection Processing Circuit 3

Figure 3:
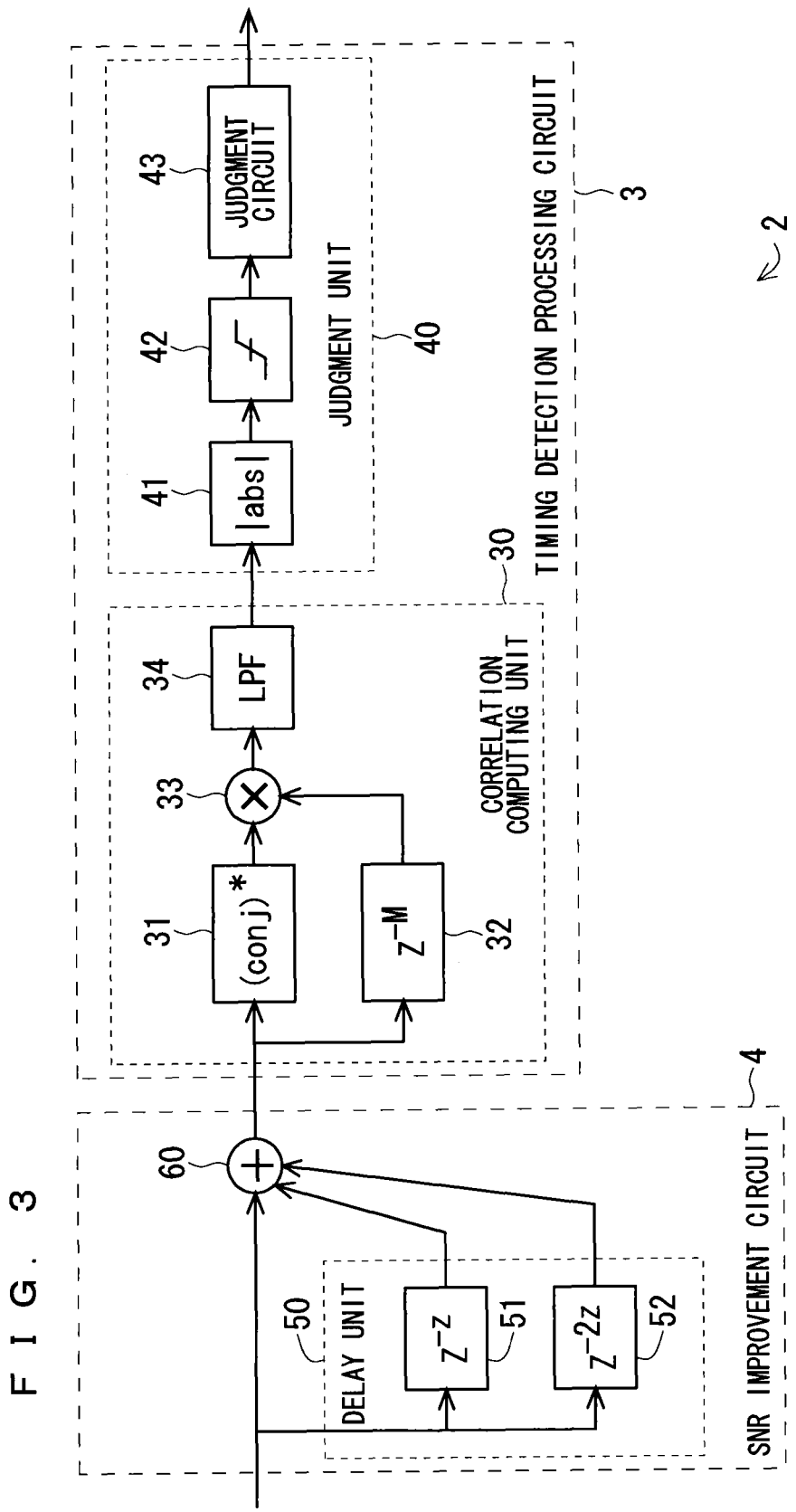
FIG. 3 is a block diagram showing constitutional examples of a timing detection processing circuit and an SNR improvement circuit according to the first embodiment.

FIG. 3 shows a constitutional example of the timing detection processing circuit 3. FIG. 3 also shows a constitutional example of the SNR improvement circuit 4, and this will be described later.

The timing detection processing circuit 3 has a correlation computing unit 30 and a judgment unit 40 in the example of FIG. 3.

The correlation computing unit 30 computes an autocorrelation of an input signal into the timing detection processing circuit 3 (herein, an output of the SNR improvement circuit 4), and outputs a result of the computing, namely a correlation function. In the example of FIG. 3, the correlation computing unit 30 has a complex conjugation circuit 31, a delay circuit 32, a multiplication circuit 33, and a filter 34.

In the correlation computing unit 30, an input signal (here, an output of the SNR improvement circuit 4) is inputted into the complex conjugation circuit 31 and the delay circuit 32. The complex conjugation circuit 31 generates a complex conjugation signal of the input signal, and outputs it. The delay circuit 32 delays the input signal by predetermined time M, and outputs it. Although the delay time M can be set at a value which is natural-number (but not larger than a total number of fixed pattern signals 16 in the synchronization header 11) times larger than the period z of the STF 14 (see FIG. 2), M is generally set at a value which is several times larger than z since, when the value of M becomes large, the delay becomes large. Here, M=z. It is to be noted that a set value for z is known, and has been given to the communication device 1. The output of the complex conjugation circuit 31 and the output of the delay circuit 32 are multiplied by the multiplication circuit 33, and a result of the multiplication is inputted into the filter 34. The filter 34 is so-called a moving average computing circuit (a kind of LPF), which computes a moving average of the input signal (i.e., output of the multiplication circuit 33) concerning a predetermined time width, and outputs a result of the computing. The output of the filter 34 corresponds to an output of the correlation computing unit 30.

Here, the reception signal after the processing by the SNR improvement circuit 4 is inputted into the correlation computing unit 30, but the configuration of the packet 10 contained in the reception signal is itself not changed by the SNR improvement circuit 4. Hence by the processing in the correlation computing unit 30, a signal is outputted which indicates a strong correlation with the STF 14 having periodicity in the packet 10.

The judgment unit 40 judges the timing for synchronization with the received packet 10 from the correlation function generated by the correlation computing unit 30. In the example of FIG. 3, the judgment unit 40 has an absolute value circuit 41, a comparative circuit 42, and a judgment circuit 43.

The absolute value circuit 41 generates a signal of an amplitude absolute value of the output signal of the correlation computing unit 30, or a value corresponding thereto. As the absolute value circuit 41, for example, a square circuit for squaring the input signal and outputting it can be used. The comparative circuit 42 compares the output of the absolute value circuit 41 with a previously set threshold, and outputs a result of the comparison. The judgment circuit 43 judges from the result of the comparison by the comparative circuit 42 whether the output of the absolute value circuit 41 has a peak exceeding the threshold. Such a peak corresponds to a peak in the correlation function generated by the correlation computing unit 30, and is based on the presence of the STF 14 in the packet 10. That is, the judgment circuit 43 judges the timing for occurrence of the STF 14. The judgment circuit 43 outputs a synchronization timing signal, thereby to inform the outside of the judgment circuit 43 of the timing for occurrence of the STF 14.

As thus described, the exemplified timing detection processing circuit 3 detects the synchronization header 11 through use of the periodicity of the STF 14, thereby to detect the synchronization timing.

In addition, the configuration of the timing detection processing circuit 3 is not restricted to this example, but it is possible to adopt a variety of configurations where the timing for synchronization with the received packet 10 is detectable out of a reception signal.

Example of SNR Improvement Circuit 4

In the example of FIG. 3, the SNR improvement circuit 4 has a delay unit 50 and an adder 60.

The delay unit 50 delays a reception signal (here, a digital OFDM baseband signal) as an input signal into the SNR improvement circuit 4, to generate two delay signals. In the example of FIG. 3, the delay unit 50 has a delay circuit 51 for delaying the reception signal with delay time (i.e., z) corresponding to one period of the STF 14 (see FIG. 2), and a delay circuit 52 for delaying the reception signal with delay time (i.e., 2×z) corresponding to two periods of the STF 14.

The adder 60 adds the two delay signals outputted from the delay unit 50 and the reception signal (i.e., input signal before being delayed). The adder 60 can be configured by an adder circuit. A result of the addition by the adder 60 becomes an output of the SNR improvement circuit 4, which is inputted into the timing detection processing circuit 3.

An operation principle of the SNR improvement circuit 4 will be described. First, two signals $Y_1, Y_2$ are defined by the following equations (1) and (2).

$$Y_1 = S + N_1 \quad (1)$$

$$Y_2 = S + N_2 \quad (2)$$

S is a signal component and N is a white noise component in the equations (1) and (2). An added signal (synthesized signal) Y of the signals $Y_1, Y_2$ is expressed by the following equation (3).

$$Y = Y_1 + Y_2 = 2S + N_1 + N_2 \quad (3)$$

Further, when an SNR of each of the signals $Y_1, Y_2$ before addition is an $SNR_{single}$, $SNR_{single}$ is given by the following equation (4). It is to be noted that "E" represents average computing, and it is a notation generally used at the time of calculating power of noise.

$$SNR_{single} = \frac{S^2}{E(N^2)} \quad (4)$$

Further, in view of the following equations (5) and (6) concerning properties of the white noise, $SNR_{mrc}$ as an SNR of the added signal Y is given by the following equation (7).

$$N_1 \neq N_2 \quad (5)$$

$$E[N_1^2] = E[N_2^2] = E(N^2) \quad (6)$$

$$SNR_{mrc} = \frac{(2S)^2}{E[(N_1 + N_2)^2]} \quad (7)$$
$$= \frac{4S^2}{E[N_1^2] + E[2N_1 N_2] + E[N_2^2]}$$
$$= \frac{4S^2}{2E(N^2)} = 2\frac{S^2}{E(N^2)} = 2SNR_{single}$$

Concerning the equation (7), it is to be noted that, the following equation (8) is held since white noise components $N_1, N_2$ are uncorrelated and the following equation (9) is held since the signal component S and the white noise component N are uncorrelated.

$$E[2N_2N_2]=0 \quad (8)$$

$$E[SN]=0 \quad (9)$$

A gain of the SNR is expressed by the following equation (10) from the equations (4) and (7).

$$10\log_{10}\left(\frac{SNR_{mrc}}{SNR_{single}}\right) = 10\log_{10}(2) = 3 \text{ dB} \quad (10)$$

Here, it was assumed that in the equation (1), the signals $Y_1, Y_2$ have the same signal component S. Such a signal component S, for example, corresponds to a portion of the STF 14 in the input signal into the SNR improvement circuit 4 and a portion of the STF 14 in the output signal of the delay circuit 51. That is, although there is displacement of delay time z between the input signal into the SNR improvement circuit 4 and the output signal of the delay circuit 51, both signals have the same signal component in the portion of the STF 14.

For this reason, when the above two signals are added, amplitude of the signal component S becomes twice larger (see equation (3)), and power thereof becomes four times larger. On the other hand, since the noise component is random and uncorrelated, amplitude of the signal after addition does not becomes twice larger (see equation (3)), and power thereof becomes twice larger. For this reason, the SNR can be improved by 3 dB (see equation (10)).

From a similar viewpoint, in the case of further adding the output signal from the delay circuit 52, the power of the signal component becomes nine times larger and the power of the noise component becomes three times larger, whereby the gain of the SNR becomes 4.8 dB. See the following equation (11).

$$10\log_{10}\left(\frac{SNR_{mrc}}{SNR_{single}}\right) = 10\log_{10}(3) = 4.8 \text{ dB} \quad (11)$$

That is, by the SNR improvement circuit 4, the reception signal with the improved SNR can be provided to the timing detection processing circuit 3.

Figure 4:
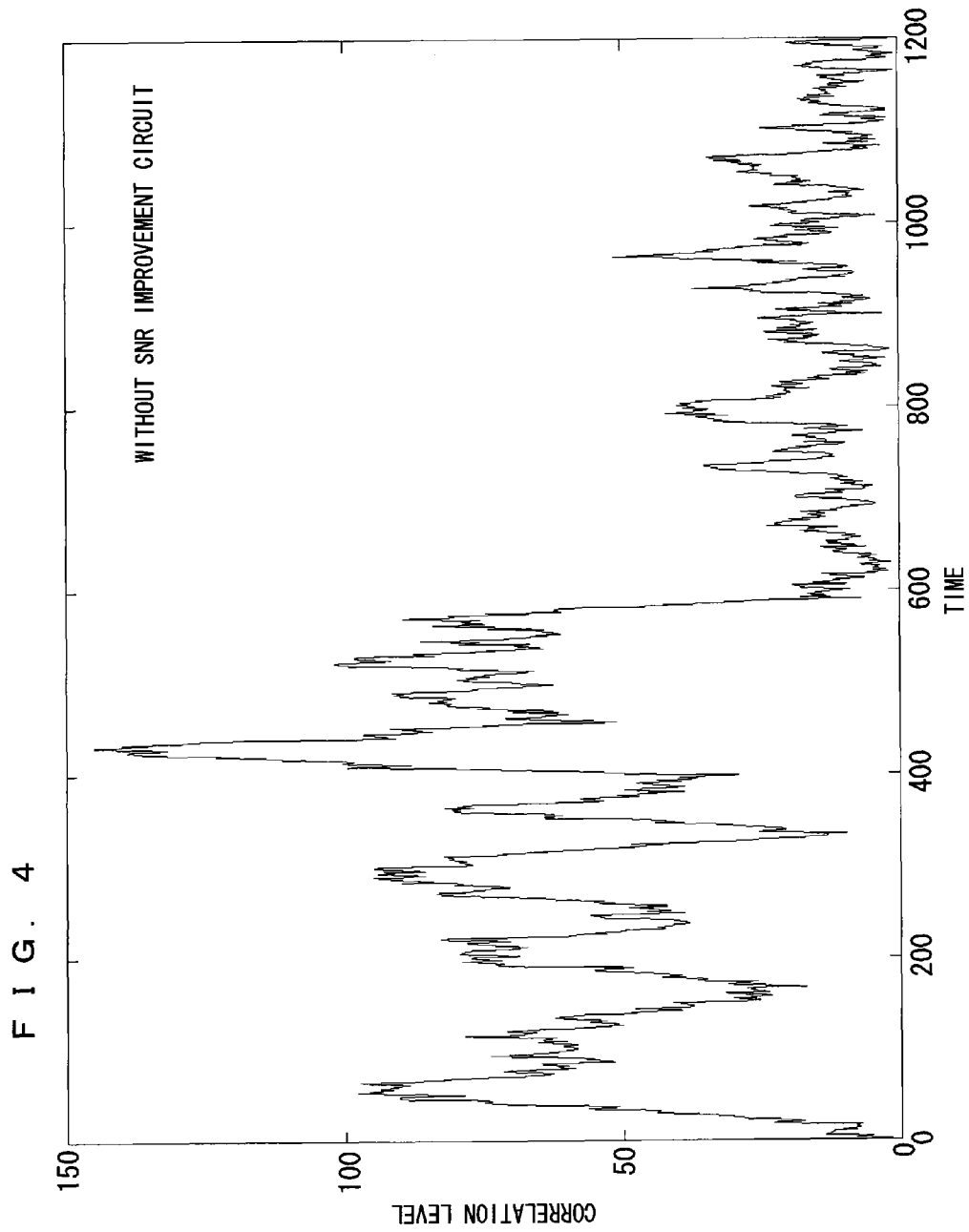
FIG. 4 is a waveform diagram exemplifying a correlation computing result in the case of the SNR improvement circuit not being present according to the first embodiment.
Figure 5:
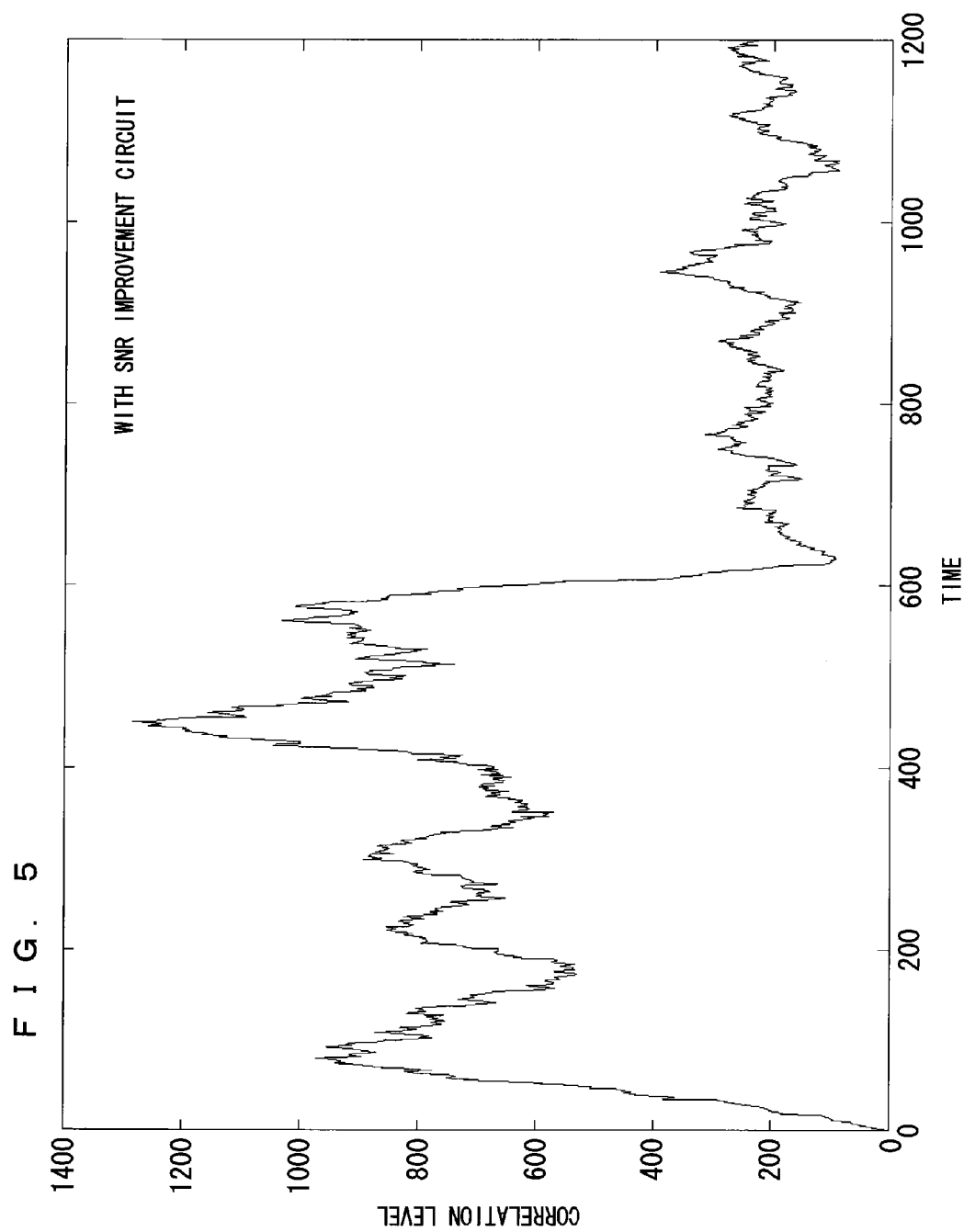
FIG. 5 is a waveform diagram exemplifying a correlation computing result in the case of the SNR improvement circuit being provided according to the first embodiment.

Here, FIG. 4 exemplifies an output signal waveform of the correlation computing unit 30 (or the absolute value circuit 41) in the case of the SNR improvement circuit 4 being not present, and FIG. 5 exemplifies an output signal waveform of the correlation computing unit 30 (or the absolute value circuit 41) in the case of the SNR improvement circuit 4 being provided. In FIGS. 4 and 5, a horizontal axis indicates time and a vertical axis indicates a signal level, namely a correlation level. It should be noted that, if reduction scales of the vertical axes in FIGS. 4 and 5 are made uniform, the waveform of FIG. 4 will become small, and hence FIG. 4 shows the waveform enlarged in the direction of the vertical axis.

When the SNR improvement circuit 4 is not present, as seen from FIG. 4, a large number of fine peaks occur. As opposed to this, when the SNR improvement circuit 4 is present, as seen from FIG. 5, peaks have become obvious as compared with the waveform of FIG. 4. For this reason, in the case of performing peak detection by, for example, means of comparison with a predetermined threshold, the detection accuracy can be improved by adoption of the SNR improvement circuit 4.

As thus described, by the SNR improvement circuit 4, the STF 14 as the periodic signal is amplified in the output signal from the adder 60 as compared with in the original input signal. On the other hand, since noises contained in the input signal are random and phases thereof are not uniformed, amplitudes of the noises are not uniformly amplified. Hence it is possible to improve the SNR of the STF 14. Furthermore, since the SNR improvement effect can be obtained by such simple processing as delaying and addition, it is possible to provide the SNR improvement circuit 4 at low cost.

In the above-exemplified SNR improvement circuit 4, the delay unit 50 generates two delay signals. As opposed to this, the number of delay signals generated by the delay unit 50 can be made one or can be made three or more. At this time, the larger the number of delay signals is, the larger the SNR improvement effect becomes, but it is possible to obtain an SNR improvement effect which strikes a balance with the delay through use of the above-exemplified two delay signals. Further, with two delay signals, the configuration of the delay unit 50 can be simplified.

Here, the SNR improvement effect can be obtained by the delay unit 50 generating one or more delay signals with delay time which is α times longer than the period z of the STF 14. It is to be noted that α is a natural number, and in the case of generating two or more delay signals, different values are set with respect to the respective delay signals. Moreover, an upper limit of α is set at a value not larger than a total number of fixed pattern signals 16 in the synchronization header 11.

Further, according to the synchronization timing detection circuit 2 provided with the SNR improvement circuit 4, the timing detection processing circuit 3 performs detection of the timing for the STF 14 on the output of the SNR improvement circuit 4, and thus it is possible to obtain high detection accuracy.

Moreover, with such a synchronization timing detection circuit 2 adopted into the communication device 1, it is possible to detect the synchronization header 11 with high detection accuracy. Hence a probability for detecting the packet out of the reception signal, namely a packet catch rate, becomes high. This can result in improvement in communication efficiency.

Second Embodiment

Generally, a signal obtained by adding a certain signal and a signal obtained by delaying the certain signal is similar to a reception signal transmitted by a multipath. Hence a similar effect to that of the multipath may be exerted on the output of the SNR improvement circuit 4. For example, the effect of the multipath can be ignored when there is no or a small frequency shift (i.e., frequency error), but deep fading may otherwise occur.

Moreover, at the time of down-converting the received RF signal to a baseband signal, a frequency shift occurs. Such a frequency shift may cause occurrence of fading in the signal after the addition. When the frequency shift is represented as Δf and the input signal into the SNR improvement circuit 4 is represented as $s(n)e^{i2\pi\Delta fn}$, an output signal y(n) of the SNR improvement circuit 4 is expressed by the following equation (12). It is to be noted that the noise component is ignored here for the sake of simplifying a description.

$$\begin{aligned} y(n) &= s(n)e^{i2\pi\Delta fn} + s(n-z)e^{i2\pi\Delta f(n-z)} + s(n-2z)e^{i2\pi\Delta f(n-2z)} \\ &= s(n)e^{i2\pi\Delta fn}(1 + e^{-i2\pi\Delta fz} + e^{-i4\pi\Delta fz}) \\ &= s(n)e^{i2\pi\Delta fn}\left(e^{-i2\pi\Delta fz} + 2e^{-i2\pi\Delta fz}\frac{(e^{-i2\pi\Delta fz} + e^{i2\pi\Delta fz})}{2}\right) \\ &= s(n)e^{i2\pi\Delta fn}(e^{-i2\pi\Delta fz} + 2e^{-i2\pi\Delta fz}\cos(2\pi\Delta fz)) \\ &= s(n)e^{i2\pi\Delta f(n-z)}(1 + 2\cos(2\pi\Delta fz)) \end{aligned} \quad (12)$$

As seen from the equation (12), the frequency shift causes occurrence of fading by a component of $(1+2\cos(2\pi\Delta fz))$ other than phase rotation. For example, when $\cos(2\pi\Delta fz)=-0.5$, an added signal y(n)=0.

In the second embodiment, a configuration capable of alleviating such fading will be described.

Figure 6:
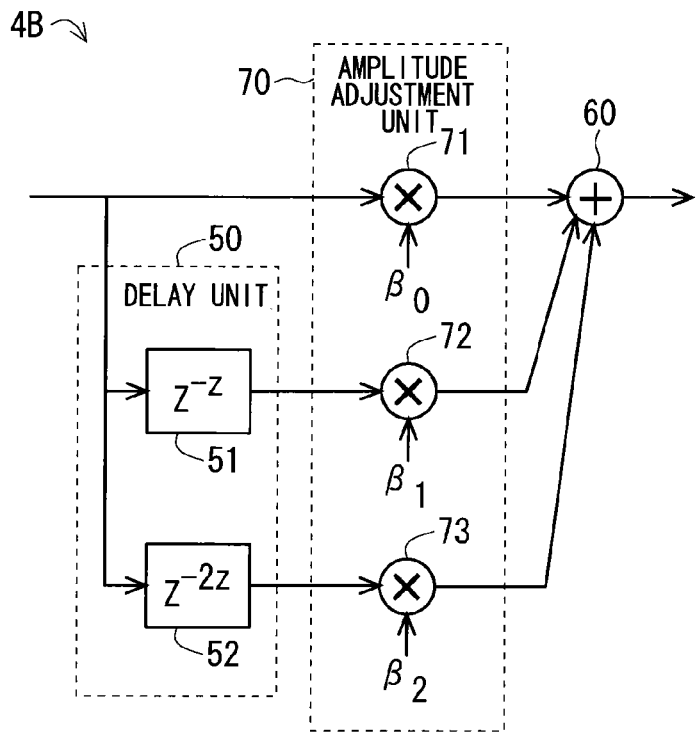
FIG. 6 is a block diagram showing a constitutional example of an SNR improvement circuit according to a second embodiment.

FIG. 6 exemplifies an SNR improvement circuit 4B according to the second embodiment. The SNR improvement circuit 4B has a configuration of the above SNR improvement circuit 4 (see FIG. 3) added with an amplitude adjustment unit 70 for adjusting amplitude of a signal to be inputted into the adder 60. In the example of FIG. 6, the amplitude adjustment unit 70 has a multiplication circuit 71 for making amplitude of an input signal into the SNR improvement circuit 4B (i.e., original signal not having been delayed) $\beta_0$ times larger, a multiplication circuit 72 for making amplitude of the output signal of the delay circuit 51 $\beta_1$ times larger, and a multiplication circuit 73 for making amplitude of the output signal of the delay circuit 52 $\beta_2$ times larger. It should be noted that multiplication coefficients $\beta_0$, $\beta_1$, $\beta_2$ are positive numbers, and each of them is previously set. In the SNR improvement circuit 4B, signals with amplitudes thereof adjusted by the multiplication circuits 71 to 73 are added in the adder 60.

An operation of the SNR improvement circuit 4B is explained by the following equation (13).

$$\begin{aligned} y(n) &= \beta_0 s(n)e^{i2\pi\Delta fn} + \beta_1 s(n-z)e^{i2\pi\Delta f(n-z)} + \beta_2 s(n-2z)e^{i2\pi\Delta f(n-2z)} \\ &= s(n)e^{i2\pi\Delta fn}(\beta_0 + \beta_1 e^{-i2\pi\Delta fz} + \beta_2 e^{-i4\pi\Delta fz}) \end{aligned} \quad (13)$$

As seen from the equation (13), by adjusting the coefficients $\beta_0$, $\beta_1$, $\beta_2$, a value of $\beta_0+\beta_1 e^{-i2\pi\Delta fz}+\beta_2 e^{-i4\pi\Delta fz}$ can be made two or more whatever value $e^{-i2\pi\Delta fz}$ becomes. For example, in the case of $\beta_0=1$, $\beta_1=4$ and $\beta_2=1$, the equation (13) becomes the following equation (14).

$$y(n) = s(n)e^{i2\pi\Delta fn} + 4s(n-z)e^{i2\pi\Delta f(n-z)} + s(n-2z)e^{i2\pi\Delta f(n-2z)} \\ = s(n)e^{i2\pi\Delta f(n-z)}(4 + 2\cos + (2\pi\Delta fz))$$ (1)

In the equation (14), the minimum value which $\cos(2\pi\Delta fz)$ can take is −1, and hence the minimum value of $(4+2\cos(2\pi\Delta fz))$ is 2. That is, power of the signal after the addition at the minimum becomes four times larger than that of the input signal. Hence it is possible to alleviate fading.

Figure 7:
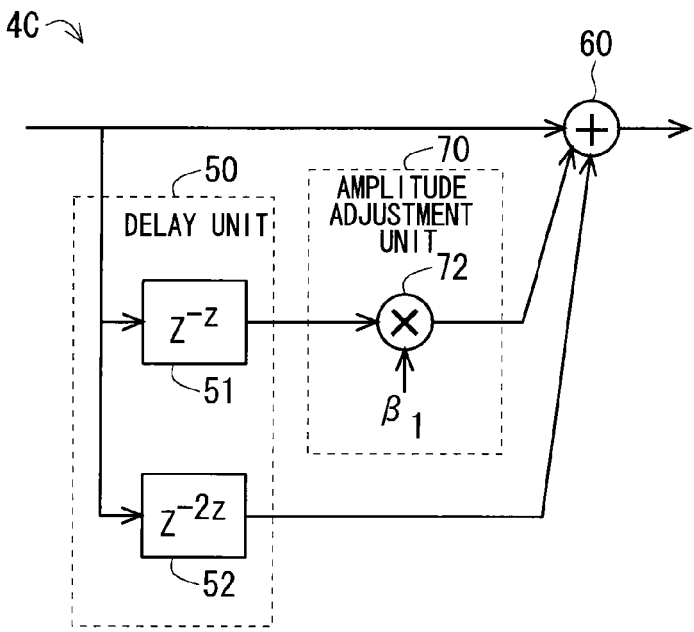
FIG. 7 is a block diagram showing another constitutional example of the SNR improvement circuit according to the second embodiment.

It is to be noted that the SNR improvement circuit 4B in the case of $\beta_0=1$, $\beta_1=4$, $\beta_2=1$ is shown as an SNR improvement circuit 4C in FIG. 7. In this SNR improvement circuit 4C, the amplitude adjustment unit 70 is configured only of the multiplication circuit 72. Especially when the coefficient $\beta_1$ is an integer of the n-th power of 2, a shift circuit can be used in place of the multiplication circuit. This also applies to the coefficients $\beta_0$, $\beta_2$.

As thus described, by setting the values of the coefficients $\beta_0$, $\beta_1$, $\beta_2$ concerning amplitude adjustment such that fading in a result of the addition in the adder 60 is alleviated more than in the configuration not provided with the amplitude adjustment unit 70, it is possible to prevent a decrease in SNR due to fading when there is a frequency error. Furthermore, since the SNR decrease preventive effect can be obtained by such simple processing as amplitude adjustment, it is possible to provide the SNR improvement circuits 4B, 4C at low cost.

As seen from the examples of the SNR improvement circuits 4B, 4C, the amplitudes of all the three signals to be inputted into the adder 60 may be adjusted or, alternatively, the amplitude of only some signal out of the three signals to be inputted into the adder 60 may be adjusted. At this time, the smaller the number of signals subjected to amplitude adjustment, the more the configuration of the amplitude adjustment unit 70 can be simplified. From such a viewpoint, the SNR improvement circuit 4C which performs amplitude adjustment only on one signal is preferable. Further, with $\beta_1=4$ set in the SNR improvement circuit 4C, amplitude adjustment can be performed not by multiplication but only by shift computing, and hence it is possible to make the circuit scale small.

Third Embodiment

In a third embodiment, another constitutional example of the delay unit of the SNR improvement circuit will be described. FIG. 8 exemplifies an SNR improvement circuit 4D according to the third embodiment. The SNR improvement circuit 4D corresponds to the SNR improvement circuit 4B (see FIG. 6).

According to the example of FIG. 8, a delay unit 50D of the SNR improvement circuit 4D has delay circuits 53, 54 where the delay time is set at z. The delay circuits 53, 54 are connected in series, an input signal into the SNR improvement circuit 4D (i.e., reception signal) is inputted into the delay circuit 53, and an output of the delay circuit 53 is inputted into the delay circuit 54. According to such a configuration, the delay circuit 53 at the preceding stage outputs a signal obtained by delaying the reception signal with the delay time z, and the delay circuit 54 at the subsequent stage outputs a signal obtained by delaying the reception signal with delay time 2×z.

The SNR improvement circuit 4D performs a similar operation to the SNR improvement circuit 4B, to exert the foregoing variety of effects.

It is to be noted that in the SNR improvement circuit 4D, a configuration where $\beta_0=\beta_1=\beta_2=1$, namely a configuration from which the amplitude adjustment unit 70 has been omitted, operates in a similar manner to the SNR improvement circuit 4 (see FIG. 3). Further, in the SNR improvement circuit 4D, a configuration where $\beta_0=1$, $\beta_1=4$, $\beta_2=1$ operates in a similar manner to the SNR improvement circuit 4C (see FIG. 7).

Modified Example

Although the cases have been exemplified where the SNR improvement circuits 4, 4B to 4D are used for the communication device 1, applications of the SNR improvement circuits 4, 4B to 4D are not restricted thereto. Specifically, the SNR improvement circuits 4, 4B to 4D are useful for a signal containing a periodic signal in which the same signal is repeated a predetermined number of times with a predetermined period, not exclusively the communication packet 10.

Further, although the cases have been exemplified above where the synchronization timing detection circuit 2 is used for giving the timing for synchronization with the packet 10 in the communication device 1, applications of the synchronization timing detection circuit 2 are not restricted thereto.

Moreover, the processing performed in the respective units 50, 50D, 60, 70 in the SNR improvement circuits 4, 4B to 4D may be realized, for example, by software. More specifically, the processing in the respective units 50, 50D, 60, 70 may be written on the program and stored into the memory, and the program may be executed by a processor (i.e., computer)

The foregoing program and processor may be mounted in the SNR improvement circuit or, for example, in the case of executing the program by means of a personal computer, improvement in SNR can be simulated.

Moreover, the processing performed in the synchronization timing detection circuit 2 can also be realized, for example, by software.

While the invention has been shown and described in detail, the foregoing description is in all aspects illustrative and not restrictive. It is therefore understood that numerous modifications and variations can be devised without departing from the scope of the invention.

EXPLANATION OF REFERENCE NUMERALS 1 communication device
2 synchronization timing detection circuit (synchronization information detection circuit)
3 timing detection processing circuit (synchronization information detection processing circuit)
4, 4B to 4D SNR improvement circuit
10 packet
11 synchronization header
14 STF (periodic signal)
16 fixed pattern signal
50, 50D delay unit
51 to 54 delay circuit
60 adder
70 amplitude adjustment unit
z period

The invention claimed is:
1. A Signal to Noise Ratio (SNR) improvement circuit for improving an SNR of an input signal, the circuit comprising:
   a delay unit for delaying said input signal to generate one or more delay signals;

an adder for adding said one or more delay signals and said input signal before being delayed, wherein:
  said input signal contains a periodic signal in which a same signal is repeated a predetermined number of times with a predetermined period,
  said delay unit generates said one or more delay signals with delay time which is α times longer than said predetermined period, and
  the α is a natural number, and is set at different values with respect to two or more delay signals; and
an amplitude adjustment unit for making amplitude of at least one signal out of said input signal before being delayed and said one or more delay signals β times larger, wherein:
  the β is a positive number, and is set at respective values with respect to a plurality of signals,
  said adder performs addition on said at least one signal by use of said signal after the amplitude thereof has been made β times larger in said amplitude adjustment unit, and
  said β is set at a value which alleviates fading in a result of the addition in said adder as compared with a configuration not comprising said amplitude adjustment unit.

2. The SNR improvement circuit according to claim 1, wherein said one or more delay signals are a delay signal of said α=1 and a delay signal of said α=2.

3. The SNR improvement circuit according to claim 2, wherein
  said at least one signal processed in said amplitude adjustment unit is said delay signal of said α=1, and
  said β=4 is set with respect to said delay signal of said α=1.

4. A synchronization information detection circuit, comprising:
  the SNR improvement circuit according to claim 1; and
  a synchronization information detection processing circuit which performs processing for detecting synchronization information on said input signal from a result of addition by said adder of said SNR improvement circuit.

5. A communication device for performing communication by use of a packet having in a synchronization header a periodic signal in which a same signal is repeated a predetermined number of times with a predetermined period, the device comprising:
  said synchronization information detection circuit according to claim 4, wherein
  said SNR improvement circuit inside said synchronization information detection circuit operates on a reception signal containing said packet as said input signal, and
  said synchronization information detection processing circuit inside said synchronization information detection circuit performs detection processing for said synchronization information on an output signal from said SNR improvement circuit, to output a synchronization timing signal of said packet in synchronization with a timing for detection of said synchronization information.

6. A Signal to Noise Ratio (SNR) improvement method for improving an SNR of an input signal, the method comprising:
  delay processing for delaying said input signal to generate one or more delay signals;
  addition processing for adding said one or more delay signals and said input signal before being delayed, wherein:
    said input signal contains a periodic signal in which a same signal is repeated a predetermined number of times with a predetermined period,
    in said delay processing, said one or more delay signals are generated with delay time which is α times longer than said predetermined period, and
    the α is a natural number, and is set at different values with respect to two or more delay signals; and
  amplitude adjustment processing for making amplitude of at least one signal out of said input signal before being delayed and said one or more delay signals β times larger, wherein:
    the β is a positive number, and is set at respective values with respect to a plurality of signals,
    in said addition processing, addition is performed on said at least one signal by use of said signal after the amplitude thereof has been made β times larger in said amplitude adjustment processing, and
    said β is set at a value which alleviates fading in a result of addition in said addition processing as compared with the case of not performing said amplitude adjustment processing.

7. A synchronization information detection method, comprising:
  each processing in the SNR improvement method according to claim 6; and
  synchronization information detection processing which performs processing for detecting synchronization information on said input signal from a result of addition by said addition processing of said SNR improvement method.

* * * * *